United States Patent Office 3,544,652
Patented Dec. 1, 1970

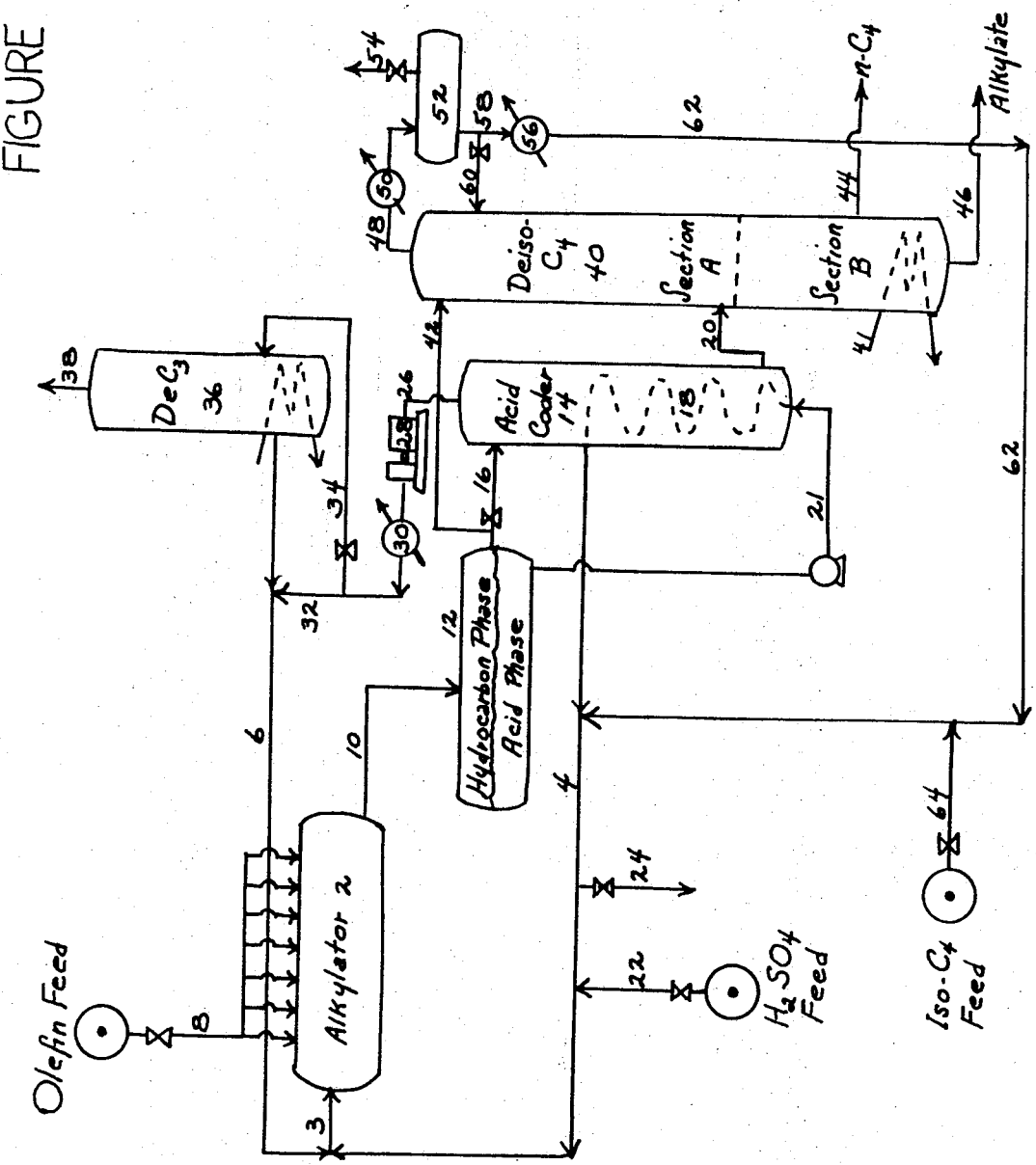

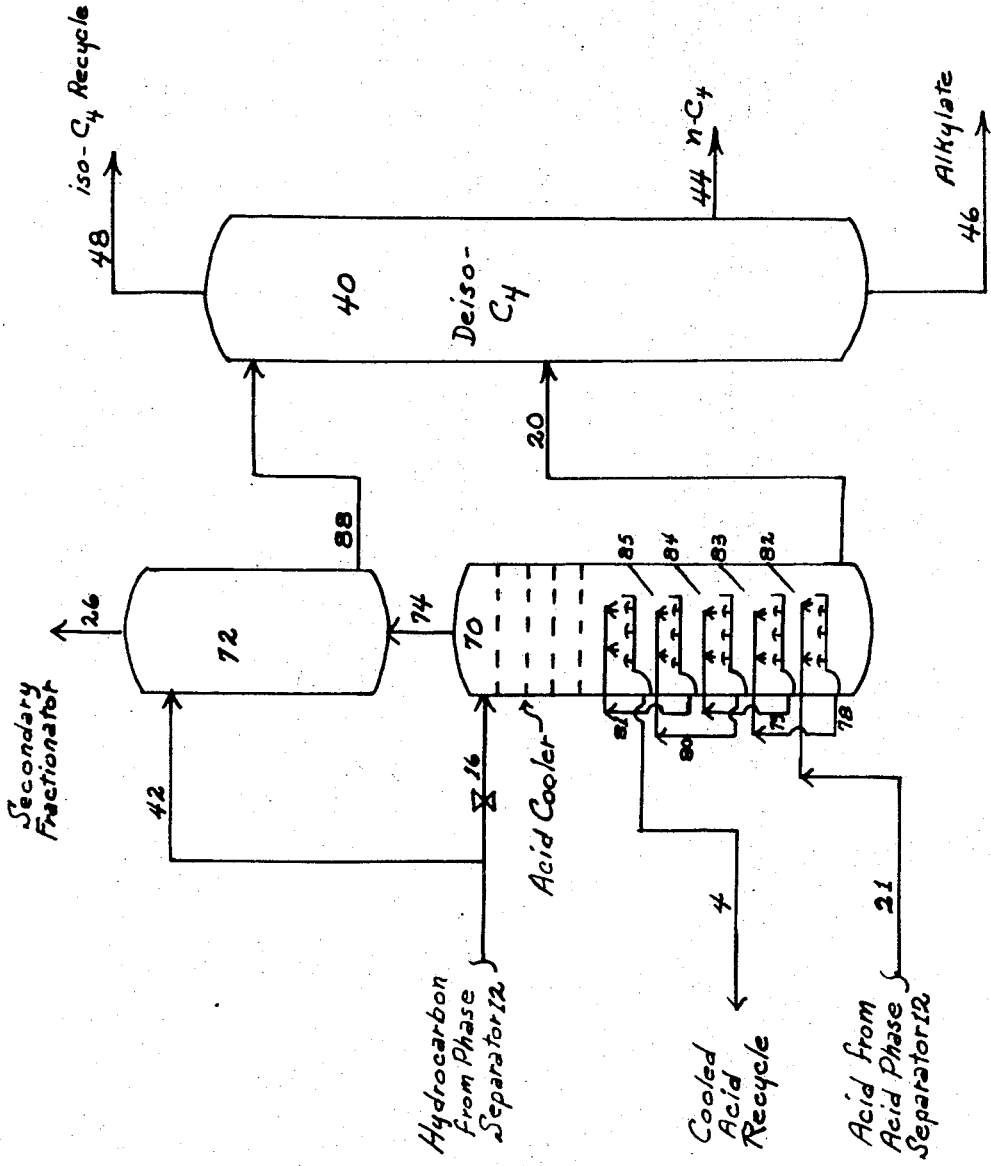

3,544,652
ALKYLATION WITH SULFURIC ACID
Christiaan P. van Dijk, Westfield, N.J., assignor to Pullman Incorporated, Chicago, Ill., a corporation of Delaware
Filed July 15, 1966, Ser. No. 565,472
Int. Cl. C07c 3/54
U.S. Cl. 260—683.59                    10 Claims

ABSTRACT OF THE DISCLOSURE

The present process relates to an improvement in the alkylation of an alkylatable hydrocarbon with an olefin at a temperature of from 0 to 120° C. In the presence of sulfuric acid catalyst which comprises introducing olefin under high velocity mixing conditions into a preformed mixture of alkylatable hydrocarbon-acid in a reaction zone so that the combined liquids substantially fill the reaction zone and the process is operated under flood conditions and maintaining sufficient pressure in the reaction zone to prevent the formation of vapors during the alkylation reaction which is carried out under adiabatic conditions. Operation under the above conditions permits recovery of two separate liquid phases from the reactor, namely, a hydrocarbon phase containing the alkylatable hydrocarbon and alkylate and a separate acid phase.

---

This invention relates to the alkylation of hydrocarbons. In one aspect, this invention relates to the alkylation of isoparaffins with olefins in the presence of a sulfuric acid catalyst to produce hydrocarbons boiling in the gasoline range.

In a typical alkylation process employing sulfuric acid catalyst, for example, the alkylation of isobutane with butylene, it is customary to maintain the acid in a high state of purity, above about 85 percent, and to maintain a high excess of isobutane with respect to butylene at all stages in the reactor. It has been found that when the acid concentration is allowed to fall below 85 percent or when the excess of isobutane is lowered, various other side reactions, such as the formation of sulfate esters and polymers takes place. Not only does by-product formation deleteriously affect the yield of desired alkylate but it has been found that the presence of these by-products also lowers the quality of the alkylate produced. The sulfate ester by-products are particularly troublesome to separate from alkylate product since they form sludge and corrosive substances in the separation apparatus from which alkylate is removed.

Heretofore the alkylation of an isoparaffin with an olefin has been carried out at a low temperature which is controlled within a very narrow range. Since it was believed that the formation of contaminant by-product was favored by temperatures of about 80° F. or higher, the temperature of the reaction zone was generally maintained at about 40° F. by evaporative cooling as in a Cascade type reactor or by refrigerant coils employed in the single chamber reactors. However, the cooling of the alkylation zone contributes a considerable portion of the expense of the alkylation process since much piping is necessary to provide vapor take-off and circulate refrigerant from the feed lines to and through the reactor.

In evaporative cooling much of the isoparaffin reactant is vaporized during the course of the alkylation and thus it is not available for the desired reaction with olefin at the point of contact in the reactor. Although such a process might supply a high isoparaffin to olefin feed ratio to the reactor, the excess isoparaffin is not efficiently employed since at the point of contact, the isoparaffin to olefin ratio is usually diminished to a level where the formation of deleterious by-products takes place in the liquid phase alkylate mixture.

The sulfate by-products of the alkylation have a secondary effect, in addition to lowering alkylate yield and quality, since they are composed of moieties derived from the sulfuric acid catalyst. Therefore, it may be said that these by-products consume the acid catalyst. The replacement of sulfuric acid to the process, particularly in the concentrations required, is a major factor contributing to the expense of alkylation.

Finally, since the presence of these contaminating by-products is the prime cause of low octane alkylate, it has been necessary to purify all alkylate feed streams of sulfur or sludge forming contaminates. For highest quality alkylate, the feed to the reaction chamber should ideally contain a pure reactant olefin and a high excess of pure reactant isoparaffin and the alkylation should be carried out in the presence of sulfuric acid of a least 90 percent concentration.

It is, therefore, an object of the present invention to provide a process which overcomes the difficulties and which practically approaches the ideal conditions recited above.

It is another object of this invention to provide better mixing and more efficient use of excess isoparaffin feed.

Another object of the present invention is to provide a more economical and more efficient process for the production of high quality alkylate.

Still another object is to provide a commercial alkylation process which results in production of alkylate having an octane number improved by several octane units.

Another object is to eliminate the expensive refrigeration in the operation of the alkylation zone.

These and other objects of the invention will become apparent to one skilled in the art from the following description and disclosure.

According to this invention an improved alkylate product is obtained in high yield by reacting an alkylatable hydrocarbon, preferably an isoparaffin, with an olefin in the liquid phase and in the presence of a high excess of sulfuric acid preferably in a multizone reactor which is operated adiabatically in the absence of vapor formation. To insure the absence of vapors, the reactor can be operated substantially under flood conditions. The sulfuric acid and hydrocarbon are fed to the alkylation zone in a ratio between about 2.5:1 and about 15:1, preferably between about 3:1 and 7:1 and an excess of alkylatable hydrocarbon, with respect to olefin is maintained both in the feed to the reactor and in the reactor at the reaction site.

During alkylation the olefin is reacted with an acid-alkylatable hydrocarbon emulsion which is formed by intimately mixing the acid and alkylatable hydrocarbon prior to contact with olefin. Although the preferred acid is sulfuric, it is to be understood that hydrofluoric acid can be used to replace the sulfuric acid, if desired. An aqueous solution of the catalyst is maintained at a concentration above 85 percent, preferably above 93 percent.

The alkylation reaction is conducted under a pressure such that the vaporization of low boiling materials in the reactor is avoided and the liquid mixture of reactants and product is carried through the reactor thus simulating operation of the process under flood conditions. It is to be understood that actual flood conditions can be employed in the reactor, if desired. Preferably the alkylation reactor is comprised of a plurality of alkylation zones arranged for series flow of liquids through the reactor, for example, as in the design of the standard Cascade reactor.

In a multizone alkylator, each zone can be modified or designed to contain a plurality of alkylation stages to which olefin reactant is fed separately. In the latter case, the stages are arranged one after the other for successive flow of the acid and isoparaffin emulsion, after the initial introduction of the emulsion, to the entrance of that particular zone. In either case, each zone or stage is equipped with a mixing device suitable for forming and maintaining the acid-alkylatable hydrocarbon emulsion and for intimately and uniformly mixing the emulsion with olefin at each site of olefin introduction. Intermittent the alkylation zones are semi-quiescent zones in which zone separation of liquids of different density can take place. When separation does occur, at least a portion, preferably a major portion, of the lower density material, comprising unreacted isoparaffin and lower boiling material, can be recirculated in the same alkylation zone while the higher density material comprising alkylate product, sulfuric acid, and unreacted isoparaffin is advanced to the succeeding zone of alkylation reactor. In the alkylation contacting apparatus containing a plurality of stages in each reaction zone, the lower density material from the semi-quiescent zone is recirculated within the same zone and through the various stages of the zones in the multizone contactor. The higher density material after passing through the zone, is transferred to the succeeding zone of the multizone contactor by hydraulic pressure. The circulation of liquid in each succeeding zone and/or stages of the alkylation reactor zone is repeated until finally a liquid mixture containing high quality alkylate in a high yield is withdrawn from the ultimate reaction zone of the reactor.

Alternatively, a single zone alkylation contactor can be employed wherein the mixture of acid-alkylatable hydrocarbon is contacted with olefin, preferably introduced at a high mixing rate from a plurality of feed points within the reactor. Reactors of this type include the tube reactors, tower reactors or horizontally disposed contacting tanks. These contactors are also operated adiabatically and preferably under flood conditions or simulated flood conditions. The ratio of acid to alkylatable hydrocarbon and the ratio of alkylatable hydrocarbon to olefin in this case are the same as those discussed above.

One advantage of the above process which is obtained from operating under flood conditions or in the substantial absence of vaporizing low boiling material, is that the total amount of isoparaffin introduced, is effectively presented for reaction with olefin at a point of olefin introduction instead of being shunted in increasing portions to a refrigeration cycle. Since no isoparaffin is lost to vaporization, a lower excess of alkylatable hydrocarbon than is normally employed can be fed to the process while higher yields of product are still obtainable. However, it is to be understood that high ratios of alkylatable hydrocarbon to olefin; e.g., 100:1 can be used in the present process, if desired.

Under the adiabatic conditions of operation in the present process, the temperature of alkylation mixture gradually increases (e.g., by about five or fifteen degrees), in the direction of liquid flow. Although the temperature does not vary by a wide margin, the increasing temperature is sufficient to reduce the viscosity of the mixture thus facilitating flow and mixing in the final zones or stages of the reactor to compensate for the increased amount of hydrocarbon added. It is important, even in the final stages of alkylation, to maintain the acid to hydrocarbon feed ratio of at least 2.5:1.

The alkylation effluent withdrawn from the reactor at a somewhat higher temperature can then be subjected to distillation or other known methods of purification and separation such as acid settling, water or caustic washing, alkylate fractionation separation, etc.

A further improvement of the present process, however, is obtained by treating the effluent withdrawn from the alkylator in a particularly novel manner devised to auto-regenerate sulfuric acid catalyst at a suitable temperature for recycle feed to the reactor. This improved process for treating the alkylator effluent comprises passing the effluent to a separation zone wherein a liquid acid phase is separated from a liquid hydrocarbon phase, e.g., by a standard method such as settling or centrifuging; introducing the separated acid phase to the lower portion of an acid cooling zone or column; passing a portion of the hydrocarbon phase to the upper portion of the acid cooling zone and reducing the pressure of this portion of the hydrocarbon phase either prior to the introduction or inside the column, thereby distilling or flashing alkylatable hydrocarbon and lower boiling hydrocarbons from a remaining liquid mixture of alkylatable hydrocarbon, alkylate and any normal paraffin contained in the hydrocarbon phase. The acid cooling zone is maintained at a reduced pressure controlled to supply required cooling to the acid by hydrocarbon vaporization. Thus, the acid is cooled against the vaporizing hydrocarbon liquid to the temperature required or to a temperature below the temperature required in the alkylation zone.

In the alkylation of an isoparaffin with an olefin, the hydrocarbon liquid withdrawn from the acid cooling zone is passed to a deisoparaffinization zone, the top of which receives the remaining portion of hydrocarbon phase from the separation zone at a higher pressure or the pressure of alkylation. The vapors from the acid cooling zone are condensed and passed to distillation for removal of materials boiling below the isoparaffin reactant. If desired, the remaining portion of the hydrocarbon phase which bypasses the acid cooling column can be contacted with the gaseous material from the acid cooling tower at a temperature between about 0° C. and about 10° C. to further promote vaporization of low boiling material. The liquid resulting from this secondary vaporization is then passed to the top of the deisoparaffinization zone.

The deisoparaffinization of isoparaffin reactant is carried out under a pressure higher than that in the acid cooling zone, i.e., between about 15 p.s.i.g. and about 200 p.s.i.g. and at a temperature of from about 50° C to about 375° C, preferably at a pressure of between about 20 ps.i.g. and about 80 p.s.i.g. or at the pressure of the alkylation zone and at a temperature between about 80° and about 150° C. Vaporous isoparaffin reactant is removed from the deisoparaffinization zone and is cooled and condensed for recycle to the alkylation zone while alkylate is withdrawn as a liquid fraction from the bottom of the deisoparaffinization zone.

When the alkylate contains a substantial amount of normal paraffin, the high pressure deisoparaffinization zone can be operated in two sections to obtain further improvement of the overall process. In this case, the hydrocarbon liquid from the acid cooling zone is introduced into the middle portion (or the bottom of the upper section) of the deisoparaffinization zone to provide fractionation of isoparaffin and lower boiling materials in the upper portion of the deisoparaffinization zone, while simultaneously allowing for distillation of alkylate from normal paraffin in the lower section of the deisoparaffinization zone. By employing this method, substantially pure normal paraffin is withdrawn as a side stream from the lower section of said zone and substantially pure alkylate product is recovered from the bottom of the deisoparaffinization zone.

The gaseous isoparaffin and lower boiling hydrocarbons withdrawn from the acid cooling zone can be condensed and passed to a separate distillation for recovery of isoparaffin liquid from lower boiling hydrocarbon vapors. The isoparaffin thus recovered can be recycled to the alkylation zone as isoparaffin feed, it desired. Fresh isoparaffin feed can be passed to the alkylation zone separately or in admixture with either or both of the isoparaffin recycle streams.

In the operation of the present alkylation process, the acid cooler from which cooled sulfuric acid, vaporous isoparaffin and the liquid alkylate mixture is separated, is preferably a column or tower provided with fractionation trays containing an acid reservoir in a portion of the lower trays. The reservoir can be formed by a depression of the tray at one end or by a U-shaped declivity in the tray or by any other means suitable for collecting the acid material of relatively high density. The reservoirs are supplied with acid draw-off lines for recovery of the acid. Ideally the draw-off lines are arranged so that the cooled acid from a lower tray can be successively passed to an overhead tray for further cooling in a closely controlled manner in the lower portion of the column. The cooled acid is then transferred to the alkylation zone either by way of increment feed to each reaction zone and/or as an acid stream to the first alkylation zone in an emulsion with isoparaffin reactant. It is particularly beneficial to introduce acid into the reactor at substantially the desired temperature of the reactor, although acid recycle at a temperature slightly below the desired temperature of operation is not detrimental to the process. As an alternative to this method of acid cooling by direct heat exchange, the acid cooling zone can be equipped with a cooling coil and the separated acid phase can be introduced into the coil to be cooled in this zone by indirect heat exchange with the distilling hydrocarbon phase.

The low pressure acid cooler preforms the simultaneous advantages of cooling acid and prefractionating isoparaffin reactant and low boilers from the alkylate effluent while concentrating normal paraffin in the liquid before entry into the deisoparaffinization zone; consequently, the standard high pressure deisoparaffinization tower can be considerably reduced in size to complete the removal of isoparaffin reactant from alkylate and to efficiently separate substantially pure n-paraffin from alkylate as liquid fractions, when the sectional deisobutanization zone is employed. The acid cooler employed in the present invention provides commercial feasibility to the operation of the deisobutanization zone for removal of separate effluents of isoparaffin, normal paraffin and alkylate in a substantially pure state. Attempts to accomplish this separation in prior processes have resulted in the separation of fractions of low purity.

Generally, according to this invention, the alkylatable hydrocarbons are those usually employed in alkylation processes preferably those having not more than six carbon atoms and include isobutane and isopentane as the most preferred species. However, it is to be understood that hydrocarbons of from two to ten carbon atoms, including ethane, propane, benzene and methyl and/or ethyl-substituted butanes, pentanes, hexanes and heptanes are also suitably employed in the process of the present invention.

Among the olefins which are reacted with the alkylatable hydrocarbon, propene and butene are most preferred. However, olefins of from two to ten carbon atoms can be employed in the present process. These include the unsaturated and branched chain derivatives of the paraffins recited above.

The alkylation reaction can be initiated at a temperature within the range of from about 0° C. to about 130° C., preferably from about 5° C. to about 60° C. under a pressure sufficient to maintain liquid phase conditions, e.g., from about 2 to about 10 atmospheres.

The sulfuric acid or hydrofluoric acid catalyst of the alkylation reaction is employed in an aqueous solution of from about 88 to 99 percent acid and the high ratio of acid to hydrocarbon in the process, i.e., between 2.5:1 and about 15:1, is maintained by high acid recycle for which the present process is designed. At least about 95 percent, preferably about 99 percent of the cooled acid is recycled to the reactor and this high recycle is made possible by the operating conditions of the present process which completely eliminate, or suppress to a minimum, the side reactions of the alkylation, particularly those involving the formation of sulfates.

For a more complete and better understanding of the present invention reference is had to the drawings which illustrate particular embodiments of the present invention. It is to be understood, however, that the present invention is not limited to the specific operational steps and apparatus described in the drawings and that many modifications of these embodiments will become apparent to those skilled in the art.

FIG. 1 illustrates an alkylation process wherein 3340 lbs. moles/hr. of isobutane, 441 lbs. moles/hr. n-butane, and 817 lbs. moles/hr. propane and lower boiling materials such as methane, ethane and propene are introduced into alkylator 2 by means of line 3 from line 6. An additional 6859 lbs. moles/hr. of isobutane, 1124 lbs. moles/hr. n-butane, 14 lbs. moles/hr. of heavier material, 435 lbs. moles/hr. of propane and lower boiling materials and 8,080,000 lbs./hr. of 93 percent sulfuric acid is introduced into alkylator 2 by means of line 3 from line 4. The alkylation zone is operated between 5° C. and 12° C. under a pressure of 4 atmospheres.

In the alkylator the acid and isobutane mixtures are emulsified prior to contact with olefin entering alkylator 2 by means of line 8 by multipoint injection. The olefin feed contains 845 lbs. moles/hr. of butylenes, 360 lbs. moles/hr. of butanes and 10 lbs. moles/hr. of lower boiling materials such as methane, ethane, propane and unsaturates. The mole ratio of isobutane to butylene fed to the reactor is 12:1 while the mole ratio of sulfuric acid to hydrocarbon in the feed is controlled at 6:1. The pressure in the reactor is maintained to pass the liquid through the reactor, to prevent vaporization of the lower boiling materials and to insure liquid phase conditions. Intimate and uniform mixing of the olefin with the isobutane-sulfuric acid emulsion is provided by a series of mixers and a high degree of mixing is obtained by high efficiency stirrers. Good mixing in the final alkylation zones is aided by the adiabatic conditions employed in alkylator 2 which decreases the viscosity of the hydrocarbon enriched liquid. Adiabatic operation results in a temperature increase of 7° C. from the point of isobutane-acid introduction to the point of product effluent removal. The particular alkylator employed in the drawing is of the Cascade type containing a plurality of alkylation chambers or zones (not shown). Under the conditions of the present example, this multizone reactor is operated under flood conditions.

The reactor effluent containing 898 lbs. moles/hr. of alkylate, 8,080,000 lbs./hr. sulfuric acid, 9331 lbs. moles/hr. of unreacted isobutane, 1925 lbs. moles/hr. of normal butane, and 1249 lbs. moles/hr. of materials boiling below isobutane is withdrawn from alkylator 2 by means of line 10 and is transferred to separation zone 12 wherein the hydrocarbon phase of lower density is separated from the sulfuric acid phase of higher density by settling under ambient conditions. The hydrocarbon phase is withdrawn from the separator and is divided into two parts. One part, seventy-five percent of the hydrocarbon phase, is introduced into the upper portion of acid cooling zone 14 by means of valved line 16. In the upper portion of acid cooling zone 14 the pressure of the hydrocarbon is reduced to 0.3 atmospheres gauge, thus permitting vaporization of isobutane and lower boiling materials by flashing. The acid phase from separator 12 is transferred by means of line 21 into cooling coil 18 located in the lower portion of acid cooling zone 14 wherein it is cooled against evaporating hydrocarbon leading to a final liquid hydrocarbon comprising 3658 lbs. moles/hr. of isobutane, 1003 lbs. moles/hr. of normal butane, 672 lbs. moles/hr. of alkylate and 60 lbs. moles/hr. propane and lower boiling materials. The indirect heat exchange of hydrocarbon and acid, therefore, serves to vaporize additional quantities of low boiling material from the liquid so that the higher boiling hydrocarbons become concentrated in a liquid fraction. This liquid fraction, enriched in higher boiling hydrocarbons, is withdrawn from acid cooling zone 14 by means of line 20 after cooling sulfuric acid in cooling coil 18 to a temperature of 4° C. The acid cooled to 4° C. is then withdrawn from acid cooling zone 14 by means of line 4 and 99.5 percent of this acid is recycled to the alkylator with a small amount of fresh acid introduced from valved line 22 at the temperature of alkylation. Only about 0.5 percent of acid recycle is withdrawn from the system by means of valved line 24 for purification.

The accumulated low boiling hydrocarbon vapors formed in acid cooling zone 14 are withdrawn by means of line 26 compressed to a pressure of 6.5 atmospheres absolute (gauge) in compressor 28 and condensed in condenser 30 at a temperature of 35° C. A portion, 94 percent, of the low boiling hydrocarbon condensate is recycled to alkylator 2 by means of lines 32 and 6. The remaining portion of low boiling hydrocarbon condensate from condenser 30 is passed by means of valved line 34 into the lower portion of distillation column 36 operated between 35° C. and 81° C. under 12.3 atmospheres gauge for depropanization. Propane and lower boiling materials are separated as vapors from liquid isobutane and n-butane by means of line 38 while liquid isobutane and n-butane are withdrawn from the lower portion of zone 36 by means of line 6 for recycle to alkylation zone 2.

The remaining portion of the hydrocarbon phase withdrawn from separator 12 bypasses acid cooling zone 14 and is introduced into the upper portion of deisobutanization zone 40 by means of line 42. The hydrocarbons from line 42 which are under a pressure of 6.2 atmospheres gauge supply reboiling in the top of tower 40. Deisobutanization zone 40 is operated at a temperature of about 54° C. at the top under 6.2 atmospheres gauge pressure in the upper portion (A) whereas the lower portion (B) is operated at a temperature of up to 182° C. under 6.8 atmospheres gauge. The higher temperature of the lower portion of zone 40 is maintained by steam heat supplied in coil 42. In the upper portion (A) of zone 40, the liquid hydrocarbon entering the bottom from acid cooler 14 is distilled to separate isobutane vapors and lower boiling materials from the remaining liquid components of the alkylate mixture. This liquid comprising alkylate, normal butane, and some isobutane is then additionally fractionated in the lower portion of zone 40 to vaporize remaining isobutane and to pass said isobutane vapors upwardly into section (A) and to fractionate n-butane from alkylate product. Normal butane liquid is withdrawn from an intermediate portion of zone (B) in deisobutanizer 40 by means of line 44 and alkylate is withdrawn from the bottom portion of zone (B) by means of line 46.

The vaporized isobutane, together with any lower boiling material, is withdrawn from the top of section (A) by means of line 48 and is partially condensed in condenser 50 and passed to accumulate 52. From accumulator 52 materials boiling below isobutane are bled from the system by means of valved line 54. The remaining isobutane is passed to cooler 56 by means of line 58, except for a small portion which is refluxed to the top of zone 40 by means of valved line 60. In cooler 56 the isobutane liquid is cooled to a temperature of 5° C. and recycled to alkylator 2 by means of line 62 and line 4. Fresh isobutane, sufficient to replenish the converted isobutane and to maintain the 1:12 feed ratio of olefin to isobutane, is introduced into the system by means of valved line 64.

Under the conditions employed in this embodiment, 950 lbs. moles/hr. of a n-butane containing alkylate having an octane number of 97.5 F–1, is recovered from line 46. This amount of product alkylate represents a 8.3 percent conversion of the isobutane fed to the system. All of the alkylate obtained is of the same high quality octane number.

FIG. 2 of the drawings illustrates a direct heat exchange acid cooler as an alternative to acid cooling by indirect heat exchange described above and further incorporates a prefractionation tower before the direct introduction of the hydrocarbon phase from separator 12 into deisobutanization tower 40. It is to be understood that either one or both of these alternatives, namely, the prefractionator or the direct heat exchange acid cooler can be substituted in the process described in FIG. 1. The prefractionator provides an additional improvement in the process operation and in the octane number of the alkylate product. Since the treating stages, with the exception of the prefractionator are essentially the same in FIG. 2 as in FIG. 1, the drawing of FIG. 2 indicates points of substitution by employing the same reference numerals for lines and apparatus corresponding to those shown in FIG. 1. Thus, the numerals of the isobutanization zone 40, which is operated under the same condiitons as previously described, are the same in FIG. 1 and in FIG. 2. The same acid phase feed line 21 and hydrocarbon phase feed line 16 introduced the liquid material from phase separator 12 into the same bottom and top portions of the acid cooling zone as described before. The internals of the acid cooling zone, however, represent a departure from the acid cooler described in FIG. 1 and the composition of materials in the process lines of FIG. 1 is somewhat altered in FIG. 2. To indicate the advantage of the process described in FIG. 2 over that described in FIG. 1, the process of FIG. 2 is based on the same quantity and composition of feed entering the process from lines 22, 64 and 8. In FIG. 2, 3389 lbs. moles/hr. of isobutane, 390 lbs moles/hr. of n-butane, and 817 lbs. moles/hr. propane and lower boiling materials such as methane, ethane and propene are introduced into reactor 2 by means of line 3 from line 6. An additional 7150 lbs. moles/hr. of isobutane, 830 lbs. moles/hr. of n-butane, 426 lbs. moles/hr. of propane and lower boiling material and 8,080,000 lbs./hr. of 93 percent sulfuric acid are introduced into alkylator 2 by means of line 3 and from line 4. The reactor effluent in FIG. 2 in line 10 contains 898 lbs. moles/hr. of alkylate, 8,080,000 lbs./hr. sulfuric acid, 9674 lbs. moles/hr. of unreacted isobutane, 1580 lbs. moles/hr. of normal butane and 1240 lbs. moles/hr. of propane and other materials boiling below isobutane. In zone 70 half of the hydrocarbon effluent of the reactor is contacted with the acid instead of the seventy-five percent of hydrocarbon effluent described in FIG. 1. Through line 20 the remaining liquid which is fed to the DIB tower contains 1284 lbs. moles/hr. alkylate and substantially no products boiling below isobutane. The gas generated in acid cooler 70 and the remaining half of the reactor hydrocarbon effluent is stripped in prefractionator 72. The composiiton of the resulting liquid in line 88 is 4998 lbs. moles/hr. of isobutane, 830 lbs. moles/hr. of n-butane, 363 lbs. moles/hr. of propane and 449 lbs. moles/hr. of alkylate. From the deisobutanizer in FIG. 2, a top product is obtained in line 48 containing 6272 lbs. moles/hr. of isobutane, 830 lbs. moles/hr. of n-butane and 363 lbs. moles/hr. of propane, which is recycled (as indicated on drawing 1) through feed line 62 to reactor 2. Under these conditions, an alkylate is obtained in line 46 which has an octane number of 98.0 F–1, a gain of 0.5 octane number over the alkylate recovered from the process described in FIG. 1.

In FIG. 2, zone 70 represents the acid cooler wherein the acid is cooled by direct heat exchange with the remaining liquid of the partially vaporized hydrocarbon phase from line 16, thus allowing an operating pressure of 0.7 atmosphere gauge. Acid cooling zone 70 is equipped with fractionating trays in the upper portion of the column wherein the hydrocarbon phase from line 16 is flashed and separated into vaporous isobutane and lower boiling components, withdrawn from zone 70 by means of line 74, and liquid isobutane and higher boiling components which pass downwardly in column 70. The lower portion of column 70 is equipped with a series of bubble capped trays having a declivity at one end for accumulation of acid and an overflow weir at the opposite end over which the remaining hydrocarbon liquid flows and from which it is directed to the next lower tray in zone 70. Hot acid is pumped and spray injected over the lowermost bubble capped tray in column 70 and a successive plurality of take off and spray lines 78 through 81 are provided to pass the acid from the reservoir or declivity of one tray to a tray above. The liquid hydrocarbon in acid cooler 70, in its downward passage through the column contacts the hot acid on each bubble capped tray at a gradually increasing temperature. The hydrocarbon liquid is directed over each of the lower trays by means of baffles 82 through 85. In the course of its downward passage the liquid hydrocarbon is heated and additional vaporization of low boiling hydrocarbons is effected. The vapors resulting from hot acid contact are permitted to rise to the upper portion of zone 70 by means of the bubble caps on the lower trays. The sulfuric acid in its passage upwardly through zone 70 is cooled to a lower temperature on each of the successive trays until it attains the desired recycle temperature. The acid is removed from the uppermost acid reservoir or accumulator of the acid cooler by means of line 4 from which it is recycled to alkylation zone 2 as shown in FIG. 1. The heated hydrocarbon liquid from acid cooler 2 is then transferred from the bottom of zone 70 to deisobutanization zone 40 by means of line 20 as described in FIG. 1.

The accumulated vapors from zone 70 are transferred to prefractionator or secondary fractionation zone 72 by means of line 74. In secondary fractionation zone 72, operated at about 0° C. under 0.6 atmosphere gauge, the vapors are countercurrently contacted with the remaining portion of the hydrocarbon phase withdrawn from separator 12 and which bypass the acid cooler. Thus, this liquid portion of the hydrocarbon phase is heated to effect vaporization of some isobutane and lower boiling materials prior to entry in the top of deisobutanization zone 40 from line 88. The vapors accumulated in zone 72 from the acid cooler 70 and from the vaporization of the portion of liquid hydrocarbon phase from separator 12 are withdrawn by means of line 26 and are then subjected to compression, condensation, depropanization and recycle in the manner described for FIG. 1 in zones 28 through 36.

It is to be understood, in the above description of FIG. 2 wherein the acid cooler is shown with five bubble capped trays, that fewer or more trays can be employed depending upon the conditions of operation; and that in place of bubble caps any means which permit the upward passage of vapors may be substituted. Also baffles 82 through 85 can be replaced by any means for transporting the liquid hydrocarbon downwardly over the lower trays of zone 70. The acid entering column 70 and passing upwardly therein need not be introduced by spray injection but may be introduced by any means suitable to contact hot acid with the cooler hydrocarbon liquid at various levels.

In the above drawings the Cascade alkylation reactors were used for purposes of illustration; however, it is to be understood that other alkylation contacting apparatus, including the single alkylation zone reactor equipped with a mixing device and several olefin injection points may be used if desired.

Many other modifications and variations of the embodiments specifically described in the drawings will appear to one skilled in the art without departing from the scope of this invention.

Having thus described my invention I claim:

1. In a liquid phase alkylation process in which an alkylatable hydrocarbon is reacted with an olefin at a temperature of from about 0° C. to about 130° C. in the presence of sulfuric acid catalyst in a reaction zone and a liquid hydrocarbon phase containing alkylatable hydrocarbon and alkylate and a liquid acid phase are separately recovered from the process, the improvement which comprises:
    (1) introducing into the reaction zone the sulfuric acid-alkylatable hydrocarbon liquids as an emulsion mixture wherein the sulfuric acid is present in a mole ratio of at least 2.5:1 and maintaining the sulfuric acid excess of at least 2.5:1 in the emulsion throughout the reaction;
    (2) separately introducing a liquid stream of olefin under high velocity mixing conditions into said reaction zone and into the liquid emulsion mixture so that combined streams substantially fill the reaction zone;
    (3) maintaining sufficient pressure in the reaction zone to prevent the formation of vapors during reaction in the alkylation zone and to pass the liquid through the reaction zone; and
    (4) reacting alkylatable hydrocarbon and olefin in the reaction zone and maintaining the reaction zone under adiabatic temperature conditions so that the increase in viscosity of the reacting mixture is minimized.

2. The process of claim 1 wherein the alkylation reaction is carried out in a plurality of reaction zones arranged in series, and each containing a mixing zone into which olefin is injected and the reaction medium is transported from one zone to the next in series by means of hydraulic pressure.

3. The process of claim 1 wherein the alkylatable hydrocarbon is an isoparaffin of not more than six carbon atoms.

4. In a liquid phase alkylation process in which isobutane is reacted with an olefin at a temperature of from about 0° C. to about 125° C. in the presence of sulfuric acid in a reaction zone, and a liquid hydrocarbon phase containing isobutane and alkylate and a liquid acid phase are separately recovered from the process, the improvement which comprises:
    (1) introducing a sulfuric-isobutane liquid emulsion mixture and separately introducing a liquid stream of olefin into the reaction zone so that the combined liquids substantially fill the reaction zone and mixing the olefin with the liquid emulsion mixture under high velocity mixing conditions;
    (2) maintaining sufficient pressure in the reaction zone to prevent the formation of vapors during reaction and to pass the liquid mixture through the reaction zone; and
    (3) reacting the isobutane and olefin in the reaction zone and maintaining the reaction zone under adiabatic temperature conditions so that the increase in viscosity of the reaction mixture due to the formation of sulfates and tarry by-products is minimized.

5. In a liquid phase alkylation process in which an alkylatable hydrocarbon is reacted with an olefin at a tempertaure of from about 0° C. to about 130° C. in the presence of excess acid catalyst in alkylation reaction zone to produce alkylate product contained in a liquid effluent mixture of low-boiling hydrocarbons, hydrocarbon reactants, and acid catalyst; the effluent is separated into a hydrocarbon phase containing reactant, alkylate and lower boiling materials and an acid phase in a separation zone; the acid phase and at least portion of the hydrocarbon phase is passed from the separation zone to a confined acid cooling zone; the hydrocarbon phase which is introduced into the acid cooling zone is flashed to vaporize alkylatable hydrocarbon and low-boiling hydrocarbons while simultaneously cooling the acid phase to at least the initial temperature of the alkylation reaction by the partial vaporization of the hydrocarbon phase in the acid cooling zone; and a major portion of the cooled acid phase is recycled to the alkylation reaction zone; the improvement which comprises: passing the remaining liquid of the flashed hydrocarbon phase concentrated in high boiling materials and alkylate from the flashing zone to the lower portion of the upper section of a deisoparaffinization zone which is operated in two sections wherein fractionation of isoparaffin and lower boiling hydrocarbons occurs in the upper section; separating a vaporous effluent rich in isoparaffin from the top of the deisoparaffinization zone; passing the remaining liquid from the upper section downwardly and fractionating it in the lower section of the deisoparaffinization zone to separate a substantially pure liquid alkylate effluent from lower boiling liquid material and to revaporize remaining isoparaffin for transfer into the upper section of said deisoparaffinization zone; and separately recovering the liquid alkylate effluent and the liquid lower boiling effluent.

6. In a liquid phase alkylation process in which an alkylatable hydrocarbon is reacted with an olefin at a temperature of from 0° C. to about 130° C. in the presence of excess acid catalyst in an alkylation reaction zone to produce alkylate product contained in a liquid effluent mixture of low-boiling hydrocarbons, hydrocarbon reactant, and acid catalyst; the effluent is separated into a hydrocarbon phase containing reactant, alkylate and lower boiling materials and an acid phase in a separation zone; the acid phase and at least a portion of the hydrocarbon phase is passed from the separation zone to a confined acid cooling zone; the hydrocarbon phase which is introduced into the acid cooling zone is flashed to vaporize alkylatable hydrocarbon and low-boiling hydrocarbons while simultaneously cooling the acid phase to at least the initial temperature of the alkylation reaction by the partial vaporization of the hydrocarbon phase in the acid cooling zone; and a major portion of the cooled acid phase is recycled to the alkylation reaction zone; the improvement which comprises: introducing the acid phase into the bottom portion of the flashing zone and the hydrocarbon phase into the upper portion of said flashing zone of the acid cooling zone; passing the remaining unvaporized liquid of the partially vaporized hydrocarbon phase downwardly in the acid cooling zone countercurrent to the sulfuric acid in the acid cooling zone; removing said remaining liquid from the lower portion of said acid cooling zone; separately removing the cooled acid from an intermediate portion of the acid cooling zone and separating as a vaporous overhead, low boiling hydrocarbons and distilling said vaporous low-boiling hydrocarbons overhead to recover isoparaffin reactant.

7. The process of claim 5 wherein the remaining liquid of the partially vaporized hydrocarbon phase is successively directed downwardly in a plurality of acid contacting zones each equipped with an acid accumulation zone and wherein the remaining liquid hydrocarbon is additionally distilled for separation of low boiling materials in each of the acid contacting zones by contact with hotter acid; permitting the additional vapors thus formed to rise through the acid contacting zones for accumulation and draw off from the top of the acid cooling zone together wtih vapors formed by flashing of the hydrocarbon phase; the hot acid is spray-injected into the bottom acid contacting zone for contact with liquid hydrocarbon and the acid, cooled by additional vaporization of low boiling materials in the liquid hydrocarbon, is withdrawn from the bottom acid accumulation zone and spray injected into the acid contacting zone immediately above; the acid is transported upwardly in a similar manner into each of the successive acid contacting zones for incremental cooling by contact with liquid hydrocarbon until the acid is withdrawn from an acid accumulating zone and from the acid cooling zone at the desired initial temperature of alkylation; and said withdrawn cooled acid is recycled to the alkylation zone.

8. In a liquid phase alkylation process in which an alkylatable hydrocarbon is reacted with an olefin at a temperature of from 0° C. to about 130° C. in the presence of excess acid catalyst in an alkylation reaction zone to produce alkylate product contained in a liquid effluent mixture of low-boiling hydrocarbons, hydrocarbon reactant, and acid catalyst; the effluent is separated into a hydrocarbon phase containing reactant, alkylate and lower boiling materials and an acid phase in a separation zone; the acid phase and at least a portion of the hydrocarbon phase is passed from the separation zone to a confined acid cooling zone; the hydrocarbon phase which is introduced into the acid cooling zone is flashed to vaporize alkylatable hydrocarbon and low-boiling hydrocarbons while simultaneously cooling the acid phase to at least the initial temperature of the alkylation reaction by the partial vaporization of the hydrocarbon phase in the acid cooling zone; and a major portion of the cooled acid phase is recycled to the alkylation reaction zone; and the unvaporized liquid hydrocarbon phase containing reactant and alkylate are separately withdrawn from the acid cooling zone, the improvement which comprises: forming vapors in the acid cooling zone by flashing the hydrocarbon phase and by additional vaporization resulting from the contact of the remaining liquid of the partially vaporized hydrocarbon phase with the acid in the acid cooling zone; passing the accumulated vapors from the acid cooling zone to the lower portion of a prefractionation zone wherein the vapors are countercurrently contacted with the remaining unflashed portion of the hydrocarbon phase from the separation zone to separate low boiling vapors from said remaining portion of the hydrocarbon phase; passing the vaporous low boiling hydrocarbons from the prefractionator to a fractionation zone wherein liquid, isoparaffin reactant is separated from gaseous lower boiling materials; passing the unvaporized isoparaffin reactant and higher boiling materials from the prefractionator to the upper portion of a deisoparaffinization zone; passing the remaining liquid hydrocarbon of the partially vaporized hydrocarbon phase from the acid cooling zone to the deisoparaffinization zone and separating isoparaffin reactant as a vapor from liquid alkylate in the deisoparaffinization zone.

9. In a liquid phase alkylation process in which an alkylatable hydrocarbon is reacted with an olefin at a temperature of from 0° C. to about 130°C. in the presence of excess acid catalyst in an alkylation reaction zone to produce alkylate product contained in a liquid effluent mixture of low-boiling hydrocarbons, hydrocarbon reactant, and acid catalyst; the effluent is separated into a hydrocarbon phase containing reactant, alkylate and lower boiling materials and an acid phase in a separation zone; the acid phase and at least a portion of the hydrocarbon phase is passed from the separation zone to a confined acid cooling zone; the hydrocarbon phase which is introduced into the acid cooling zone is flashed to vaporize alkylatable hydrocarbon and low-boiling hydrocarbons while simultaneously cooling the acid phase to at least the initial temperature of the alkylation reaction by the partial vaporization of the hydrocarbon phase in the acid cooling zone; and a major portion of the cooled acid phase is recycled to the alkylation reaction zone; the improvement which comprises: passing the remaining liquid of the flashed hydrocarbon phase, from the acid cooling zone and the remaining unflashed portion of the hydrocarbon phase from the separation zone to a deisobutanization zone from which vaporous isoparaffin reactant is separated as a vapor from liquid alkylate.

10. The process of claim 7 wherein the isoparaffinization zone is operated in two sections and wherein the remaining liquid hydrocarbon of the partially vaporized hydrocarbon phase from the acid cooler is introduced into the bottom of the upper portion of said deisoparaffinization zone while at least a portion of the remaining portion of the unflashed hydrocarbon phase is introduced into the top of the upper portion of said deisopraffinization zone; fractionation of vaporous isoparaffin reactant and lower boiling materials from liquid higher boiling materials takes place in the upper portion of said deisoparaffinization zone; and fractionation of higher boiling components from alkylate takes place in the lower portion of said deisoparaffinization zone; and withdrawing substantially pure alkylate from the bottom of said deisoparaffinization zone.

References Cited

UNITED STATES PATENTS

| | | | |
|---|---|---|---|
| 2,232,674 | 2/1941 | Pyzel | 260—683.59 |
| 2,341,487 | 2/1944 | Taylor et al. | 260—583.59 |
| 2,379,368 | 6/1945 | Matuszak | 260—683.59 |
| 2,474,924 | 7/1949 | Watson et al. | 260—683.59 |
| 2,831,043 | 4/1958 | Stiles | 260—683.62 |
| 2,906,796 | 9/1959 | Putney | 260—683.62 |
| 2,920,124 | 1/1960 | Stiles et al. | 260—683.59 |
| 3,068,308 | 12/1962 | Stiles | 260—683.59 |
| 3,097,250 | 7/1963 | Davies | 260—683.62 |
| 3,121,126 | 2/1964 | Goldsby et al. | 260—683.59 |
| 3,162,694 | 12/1964 | Beavon | 260—683.59 |
| 3,168,591 | 2/1965 | Beavon et al. | 260—683.59 |
| Re. 26,060 | 7/1966 | Nathan | 260—683.59 |

DELBERT E. GANTZ, Primary Examiner

G. J. CRASANAKIS, Assistant Examiner

U.S. Cl. X.R.

260—683.62